United States Patent
Klobucar

(10) Patent No.: US 12,247,735 B2
(45) Date of Patent: Mar. 11, 2025

(54) THERMAL REGENERATIVE FLUID PROCESSING APPARATUS

(71) Applicant: ROTOHEATER LLC, Ann Arbor, MI (US)

(72) Inventor: Joseph M Klobucar, Ann Arbor, MI (US)

(73) Assignee: ROTOHEATER LLC, Ann Arbor, MI (US)

( * ) Notice: Subject to any disclaimer, the term of this patent is extended or adjusted under 35 U.S.C. 154(b) by 289 days.

(21) Appl. No.: 17/736,672

(22) Filed: May 4, 2022

(65) Prior Publication Data

US 2023/0133019 A1    May 4, 2023

Related U.S. Application Data

(60) Provisional application No. 63/274,578, filed on Nov. 2, 2021.

(51) Int. Cl.
| | | |
|---|---|---|
| *F23G 7/07* | (2006.01) | |
| *F23G 5/50* | (2006.01) | |
| *F23G 7/06* | (2006.01) | |

(52) U.S. Cl.
CPC .............. *F23G 7/068* (2013.01); *F23G 5/50* (2013.01); *F23G 7/063* (2013.01); *F23G 2204/20* (2013.01); *F23G 2206/10* (2013.01); *F23G 2207/101* (2013.01); *F23G 2209/14* (2013.01)

(58) Field of Classification Search
CPC ..... F27D 17/008; F27D 2017/007; F23G 7/07
See application file for complete search history.

(56) References Cited

U.S. PATENT DOCUMENTS

| | | | | |
|---|---|---|---|---|
| 5,562,442 A | * | 10/1996 | Wilhelm | ................. F23G 7/068 110/211 |
| 5,871,347 A | | 2/1999 | Chen et al. | |
| 5,871,349 A | * | 2/1999 | Johnson | .................... F23G 7/07 165/9 |
| 5,967,771 A | | 10/1999 | Chen et al. | |
| 6,193,504 B1 | | 2/2001 | Chen et al. | |

(Continued)

FOREIGN PATENT DOCUMENTS

| | | | |
|---|---|---|---|
| KR | 101045419 B1 * | 6/2011 | |
| WO | WO-2012070892 A2 * | 5/2012 | ............. F23G 7/068 |

OTHER PUBLICATIONS

PCT/US2022/048063 International Search Report and Written Opinion dated Mar. 6, 2023.

*Primary Examiner* — Gregory A Wilson
(74) *Attorney, Agent, or Firm* — Miller Canfield

(57) ABSTRACT

A regenerative thermal oxidizer assembly includes a first housing member and a second housing member. The first housing member defines a regenerative portion and a combustion chamber. The second housing member defines an inlet chamber and an outlet chamber. A regenerator is disposed within the regenerative portion of the first housing member and defines a central axial opening extending to the combustion chamber. A thermal element extends through the axial opening to the combustion chamber for providing heat to the combustion chamber for initiating combustion inside the combustion chamber. The first housing member is rotatable around an axis defined by the axial opening relative to the second housing member for rotating the regenerator relative to the inlet chamber and the outlet chamber.

15 Claims, 6 Drawing Sheets

(56) References Cited

U.S. PATENT DOCUMENTS

| | | | |
|---|---|---|---|
| 7,833,010 B2* | 11/2010 | Baker | F23G 7/068 |
| | | | 431/31 |
| 9,958,155 B1* | 5/2018 | Park | F23G 5/46 |
| 2004/0265764 A1 | 12/2004 | Klobucar et al. | |
| 2005/0227189 A1 | 10/2005 | Ahn et al. | |
| 2006/0093975 A1 | 5/2006 | Baker et al. | |

* cited by examiner

THERMAL REGENERATIVE FLUID PROCESSING APPARATUS

PRIOR APPLICATIONS

The present application claims priority to U.S. Provisional Patent Application No. 63/274,578, filed on Nov. 2, 2021, the contents of which are included herein by reference.

ACKNOWLEDGMENT OF GOVERNMENT SUPPORT

This invention was made with Government support under 2326861 awarded by the National Science Foundation. The Government has certain rights in this invention.

TECHNICAL FIELD

The present invention relates generally toward a thermal regenerative fluid processing apparatus. More specifically, the present invention relates toward a compact, low cost thermal regenerative fluid processing apparatus.

BACKGROUND

Thermal oxidizers have been used to clean contaminated fluid for many years. More specifically, thermal oxidizers are used to remove impurities, such as, for example, greenhouse gases contained in gaseous waste from industrial processes. Gaseous waste from industrial processes is known to include volatile organic compounds (VOC's), methane, carbon monoxide, to name a few. Primarily, thermal oxidizers have been used only in large industrial facilities. As such, thermal oxidizers have always been built on large industrial scales to handle large volumes of contaminated fluids.

However, evolving environmental standards require flexibility in thermal oxidizers but has not been previously contemplated. For example, many smaller facilities such as, for example, dry cleaners, bakeries, and large scale farms are coming under increasing scrutiny to eliminate even small amounts of VOC's and other greenhouse gases. Available large industrial thermal oxidizers are not suited to handle small scale operations. Furthermore, not every VOC emitting facility requires a same sized oxidizer. Therefore, customized oxidizers are acquired but are even further cost prohibitive. Therefore, there is a need for a low cost, adaptable thermal oxidizer available for use in a variety of facilities.

SUMMARY

A regenerative thermal oxidizer assembly includes a first housing member and a second housing member. The first housing member defines a regenerative portion and a combustion chamber. The second housing member defining an inlet chamber and an outlet chamber. A regenerator is disposed within the regenerative portion of the first housing member and defines an axial opening extending through to the combustion chamber. A thermal element extends through the axial opening to the combustion chamber providing heat to the combustion chamber for initiating combustion inside the combustion chamber. The first housing member is rotatable around an axis defined by the axial opening relative to the second housing member allowing the first housing member to rotate the regenerator relative to the inlet chamber and the outlet chamber defined by the second housing member.

The unique and compact design of the thermal oxidizer of the present invention allows for implementation of a low cost thermal oxidizer applicable to nearly any facility that generates contaminated fluids that may be oxidized to reduce greenhouse gases. Making use of the axial opening simplifies overall design and eliminates sophisticated characteristics of existing oxidizers. Simplicity of providing oxidation energy to the combustion chamber through the axial opening substantially reduces cost of manufacturing the thermal oxidizer of the present invention. In addition, the compact design of the thermal oxidizer of the present invention provides the opportunity for modular implementation in any facility eliminating the need for customized design. As such, two, three or more oxidizers may be interconnected in parallel to accommodate larger scale facilities. For the first time oxidizing technology may be adapted for broad scale use achieving significant reductions in greenhouse gases previously not obtainable.

BRIEF DESCRIPTION OF THE DRAWINGS

Other advantages of the present invention will be readily appreciated as the same becomes better understood by reference to the following detailed description when considered in connection with the accompanied drawings, wherein.

DETAILED DESCRIPTION

Figure 1:
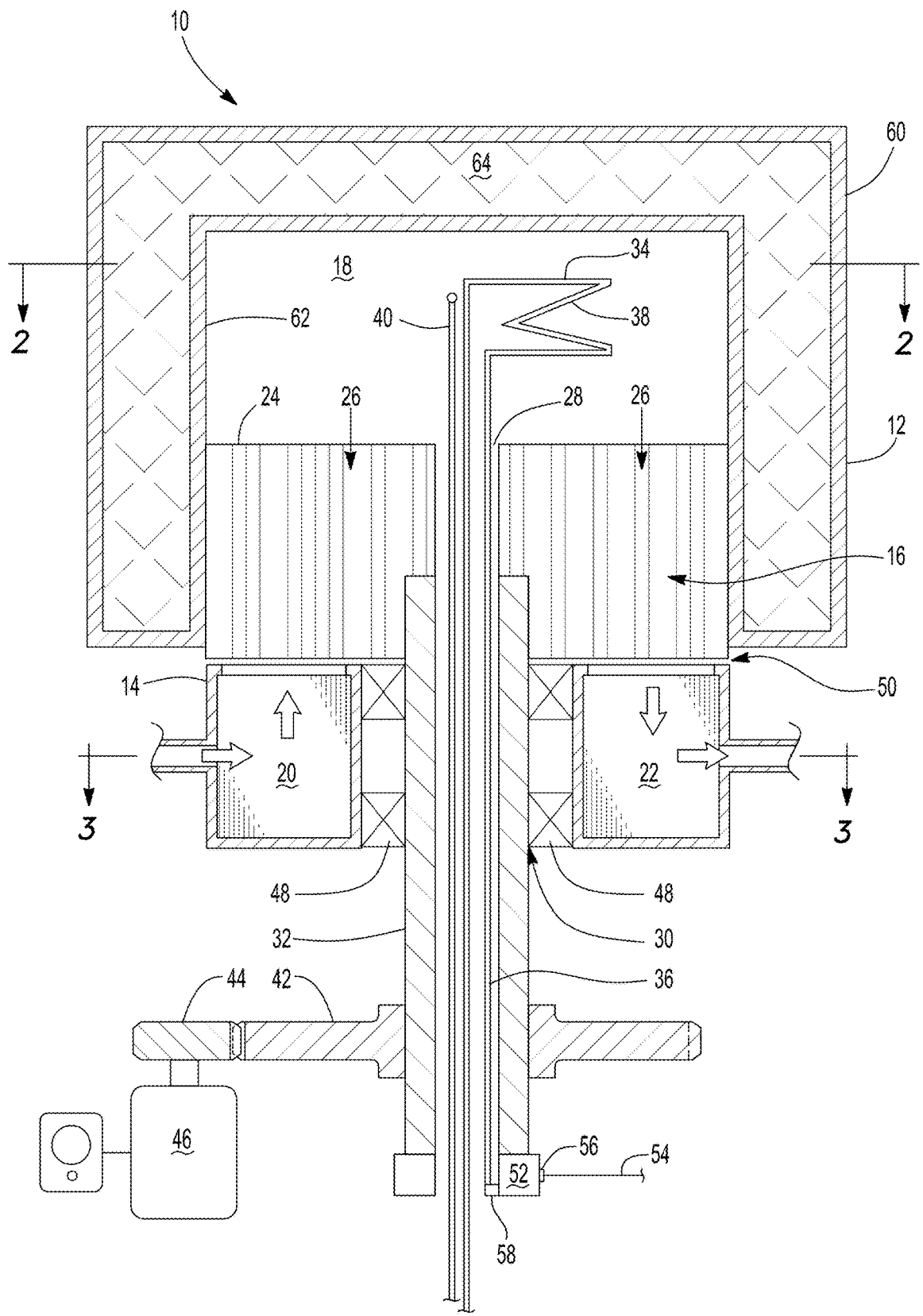
FIG. 1 shows a cross-sectional view of a regenerative thermal oxidizer of the present invention.

Referring to FIG. 1, a regenerative thermal oxidizer of the present application is generally shown at 10. The oxidizer 10 includes a first housing member 12 and a second housing member 14. The first housing member 12 defines a regenerative portion 16 and a combustion chamber 18. The second housing member 14 defines an inlet chamber 20 and an outlet chamber 22.

A regenerator 24 is disposed within the regenerative portion 16 of the first housing member 12. The regenerator 24 is formed of ceramic material pathways 26 that enable passage of gas between the second housing member 14 and the combustion chamber 18 defined by the first housing member 12 the purpose of which will be explained further here and below. The ceramic material from which the regenerator 24 is formed is capable of being heated by oxidation combustion occurring within the combustion chamber 18 and transferring this heat to inlet gases received from the inlet chamber 20 to improve oxidizer 10 efficiency.

The regenerator 24 defines a first housing axial opening 28 extending through to the combustion chamber 18. Likewise, the second housing member 14 defines a second housing axial opening 30 that is coaxial with the first housing axial opening 28. A tubular member 32 extends through the second housing axial opening 30 and is received by the first housing axial opening 28. Therefore, it should be understood that the tubular member 32 is axially aligned with the first housing axial opening 28 and the second housing axial opening 30.

A thermal element 34 extends through the tubular member 32 into the combustion chamber 18. In one embodiment, the thermal element 34 includes an electrical line 36 that provides electrical current to a heating coil 38 residing in the combustion chamber 18. In an alternative embodiment, the thermal element 34 includes an inlet tube that is interconnected to a source of combustible gas to direct the combustible gas to the combustion chamber 18 for providing sufficient combustion energy to the combustion chamber 18. With either an electrical or a gas thermal element 34, it is necessary for the thermal element 34 to provide enough heat energy to the combustion chamber 18 to oxidize dirty gas entering the combustion chamber 18 via the inlet chamber 20. A temperature probe 40 also extends through the tubular member 40 into the combustion chamber 18 to monitor temperature inside the combustion chamber 18. A seal 41 or grommet is disposed within the tubular member 40 to prevent escape of gas from the combustion chamber 18. Openings are defined in the seal 41 to allow the thermal element electrical line 36 and the temperature probe 40 to pass through to the combustion chamber 18.

The tubular member 32 includes a drive element 42 that engages a driver 44. The driver 44 translate rotary movement from a drive motor 46 to the drive element 42 for rotating the tubular member 32 around a pivot axis. The tubular member 32 is affixed to the first housing member 12 in a manner that translates rotational movement to the first housing member 12 from the driver 44.

A plurality of bearings 48 are disposed between the second housing member 14 and the tubular member 32 inside the second axial opening 30 that allows the tubular member 32 to rotate without translating rotational movement to the second housing member 14. Therefore, it should be understood that the first housing member 12 rotates around a pivot axis defined by the tubular member 32 while the second housing member 14 remains in a stationary disposition. Furthermore, the second housing member 14 is separated from the regenerator 24, and therefore the first housing member 14 by a space 50 to prevent any rotational moment being transferred from the rotating first housing member 12 to the stationary second housing member 14.

A first conductor 52 is integral with the tubular member 32 so that the conductor 52 rotates with the tubular member 32. The conductor 52 receives electrical current from electric line 54 via a first conductive leaf 56 that is in contact with the first conductor 52 but remains in a stationary position relative to the rotating conductor 52. The electric line 36 is fixedly attached to the first conductor 52 so that the first conductor 52 provides electric current through the thermal element electric line 36 to the thermal element 34. Therefore, it should be understood that the thermal element 34 rotates with the tubular member 32. Likewise, the temperature probe 40 is fixedly attached to a second conductor 58 that receives electric current from electric line 54 via a conductive leaf 56. Thus, the temperature probe 40 also rotates with the tubular member 32. The thermal element electric line 36 transfers sufficient electrical energy from the conductor 52 to the thermal element 34 for providing oxidation energy to the combustion chamber 18 defined by the first housing member 12. As explained above, the first housing member 12 rotates with the tubular member 32 along with the thermal element 34 and the temperature probe 40 while the second housing member 12 remains stationary.

Figure 2:
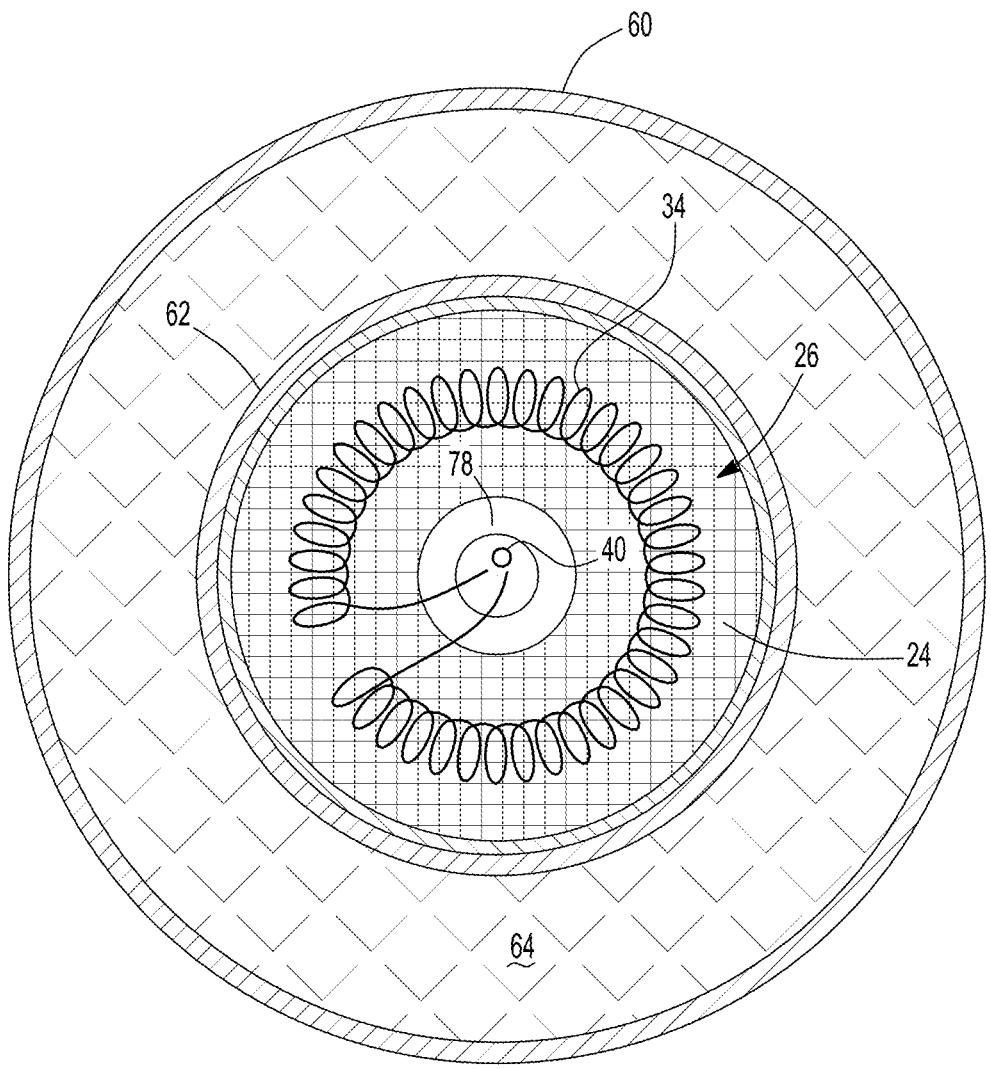
FIG. 2 shows a cross-sectional view of the combustion chamber through line 2-2 of FIG. 1.

Referring now to FIG. 2, a sectional view through line 2-2 of FIG. 1 is shown. The thermal element 34 disposed within the combustion chamber 18 takes the form of a coil that substantially circumscribes the first axial opening 28 defined by the regenerator 24. In this embodiment, that regenerator 24 defines axial passages 26 extending from the combustion chamber 18 to the space 50 that separates the second housing member 14 from the regenerator 24 as is set forth above.

The first housing member 12 defines in outer annular wall 60 that circumscribes an inner annular wall 62 so that the combustion chamber 18 is enclosed within the inner annular wall 62. In insulator 64 is disposed between the inner and outer wall 62 and the outer and inner wall 60 to contain the oxidation heat within the combustion chamber 18. In addition, the insulator 64 reduces an amount of heat that reaches the outer annual wall 60 to prevent heat radiating from the outer annular wall 60.

Figure 3:
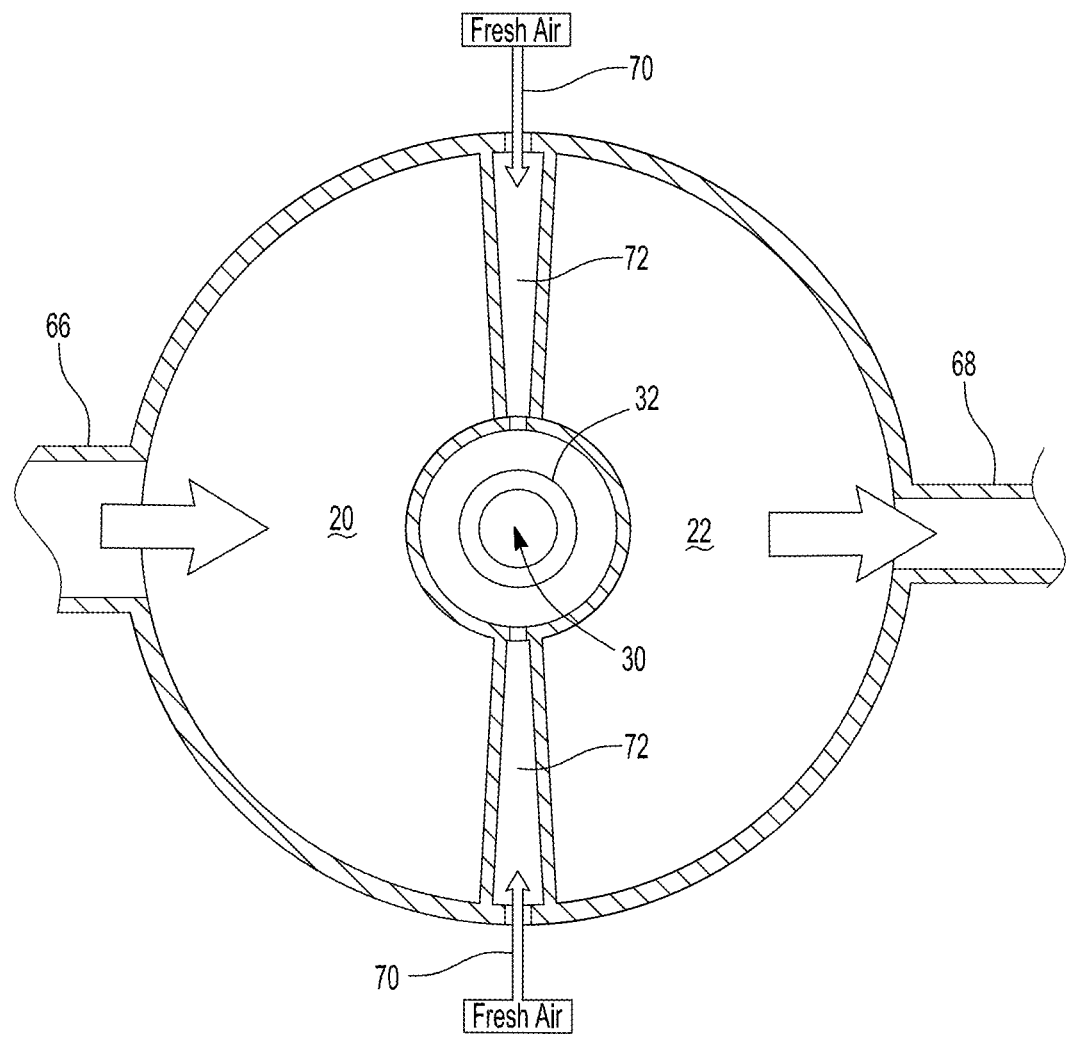
FIG. 3 shows a cross-sectional view of a second housing through line 3-3 of FIG. 1.

Referring now to FIG. 3, a sectional view of the second housing member 14 through line 3-3 of FIG. 1 is shown. An inlet conduit 66 delivers contaminated gases into the inlet chamber 20 defined by the second housing member 14. Likewise, an outlet conduit 68 is fluidly connected to the outlet chamber 22 to transfer oxidized, clean gases outwardly from the second housing member 14. The second housing member 14 also defines opposing fresh air inlet chambers 72 that separate the inlet chamber 20 from the outlet chamber 22. Fresh air is delivered to the fresh air inlet chambers 72 through fresh air inlets 70.

In one embodiment a pump or a fan establish a negative pressure within the outlet conduit 68 that in turn establishes a negative pressure within the combustion chamber 18. Generating a negative pressure in this manner assists gaseous flow through the oxidizer 10 and by drawing gasses into the combustion chamber 18 from the inlet chamber 20. It is also contemplated that the pump or fan generates enough pressure to prevent gasses from escaping though the space 50 disposed between the first housing member 12 and the second housing member 14.

It should be evident that relative position of any of the inlet chamber 20, outlet chamber 22, and fresh air inlet chamber 68 change with respect to the regenerator 24. Therefore, different portions of the regenerator 24 continuously receive inlet gases due to alignment with the inlet chamber 20 while opposite portions of the regenerator 24 transfer outlet gases from the combustion chamber 18 to the outlet chamber 22. Due to rotation, that portion of the regenerator 24 that was formerly emitting contaminated gases to the combustion chamber 18 rotates through the fresh air inlet chamber 72 for evacuating clean gasses to the outlet chamber 22. Thus, by rotating that portion of the regenerator that was previously heated by the clean gasses exiting combustion chamber 18 to an orientation for receiving contaminate gas from the inlet chamber 20, the contaminated gases are preheated and energy requirements to achieve oxidation reactions inside the combustion chamber 18 are reduced.

Figure 4:
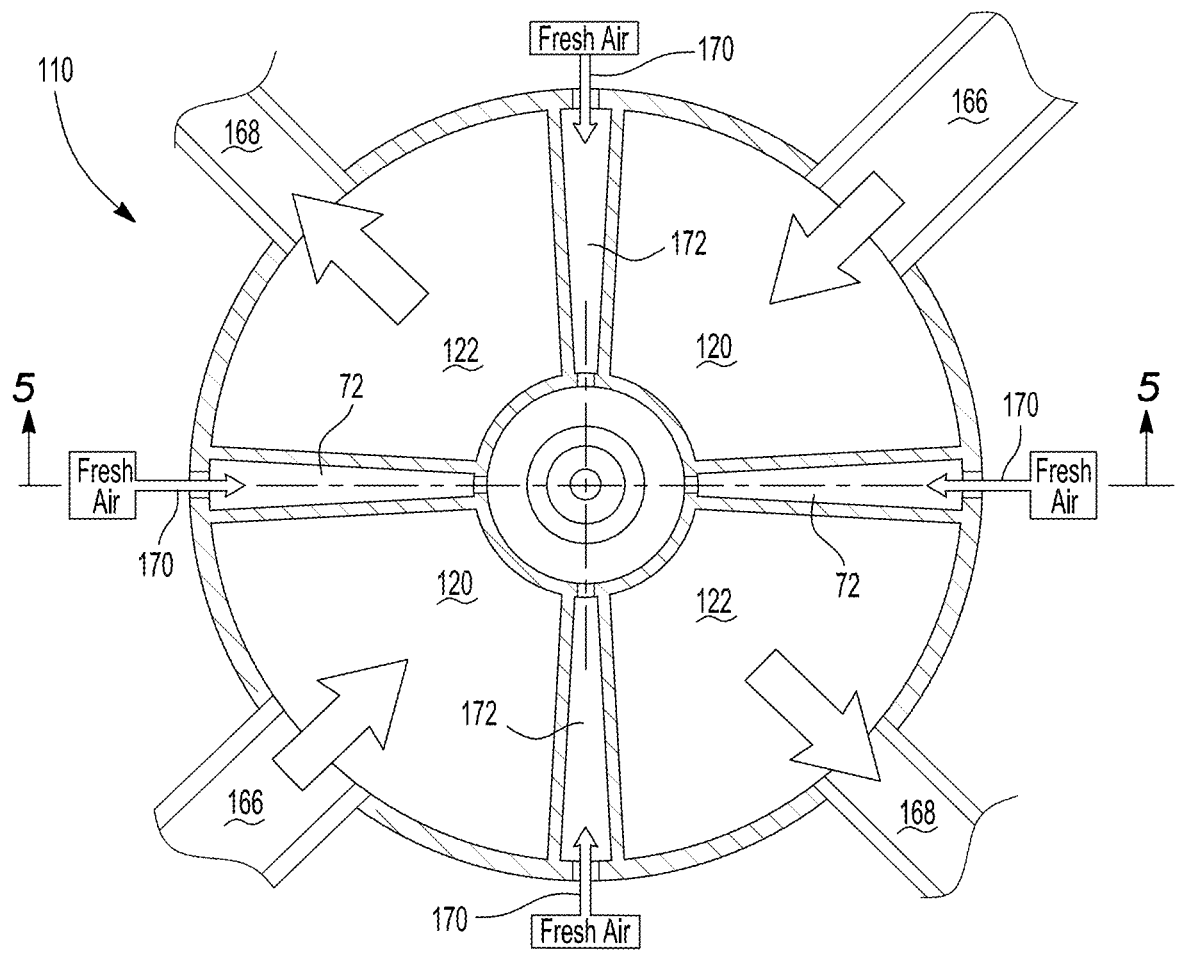
FIG. 4 shows a cross-sectional view of an alternative embodiment of the second housing.
Figure 5:
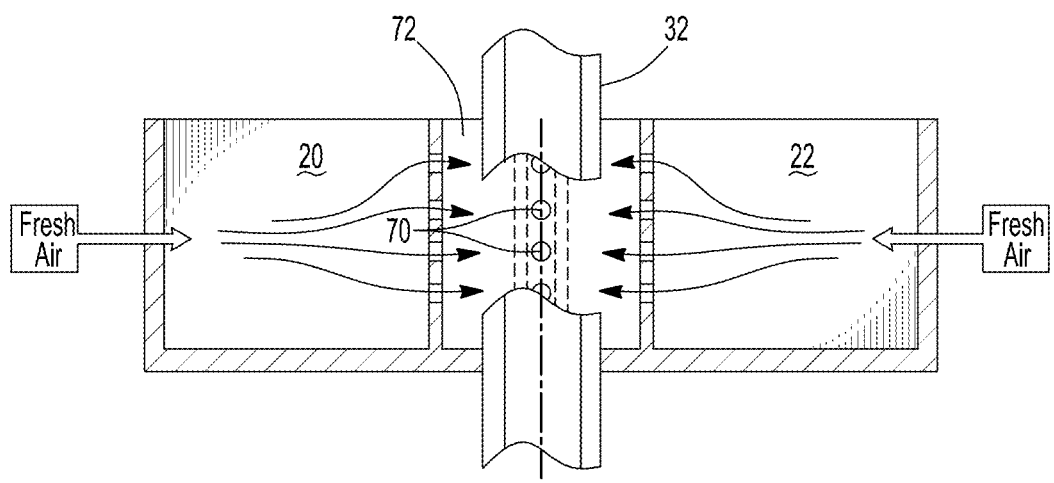
FIG. 5 shows a cross-sectional view of the second housing through line 5-5 of FIG. 4.

An additional embodiment is generally shown at 110 of FIG. 4 wherein like element numbers of the earlier embodiment are identified with the same element numbers but in the 100 series. For further adjustments in flowrates into and out of the combustion chamber 18, the first housing member 112 may be reconfigured to provide opposing inlet chambers 120 separated by opposing outlet chambers 122. As such, each inlet chamber 120 includes an individual inlet conduit 166 and each outlet chamber 122 includes an individual outlet conduit 168.

As is in the prior embodiment, each inlet chamber 120 is separated from each outlet chamber 122 by a fresh air inlet chamber 172 to provide purge gas to the regenerator 124. Therefore, four fresh air inlet chambers 172 are included in this embodiment, each receiving fresh air via a fresh air inlet 170. Otherwise, this second embodiment functions in the same manner as the first embodiment, but with more frequent passes of the regenerator 24 over inlet in outlet chambers 120, 122.

It is within the scope of this invention that a plurality of oxidizers 10 may be interconnected to increase cleaning potential for operations that may require higher rate of oxidation then a single oxidizer 10 may provide. Referring two FIGS. 6 and 7, a plurality of oxidizers is shown enclosed within a housing 74. The housing 74 defines a common contaminated gas inlet 76 and a common clean gas outlet 78. This configuration interconnects each oxidizer 10 in parallel as will be explained further hereinbelow.

Figure 6:
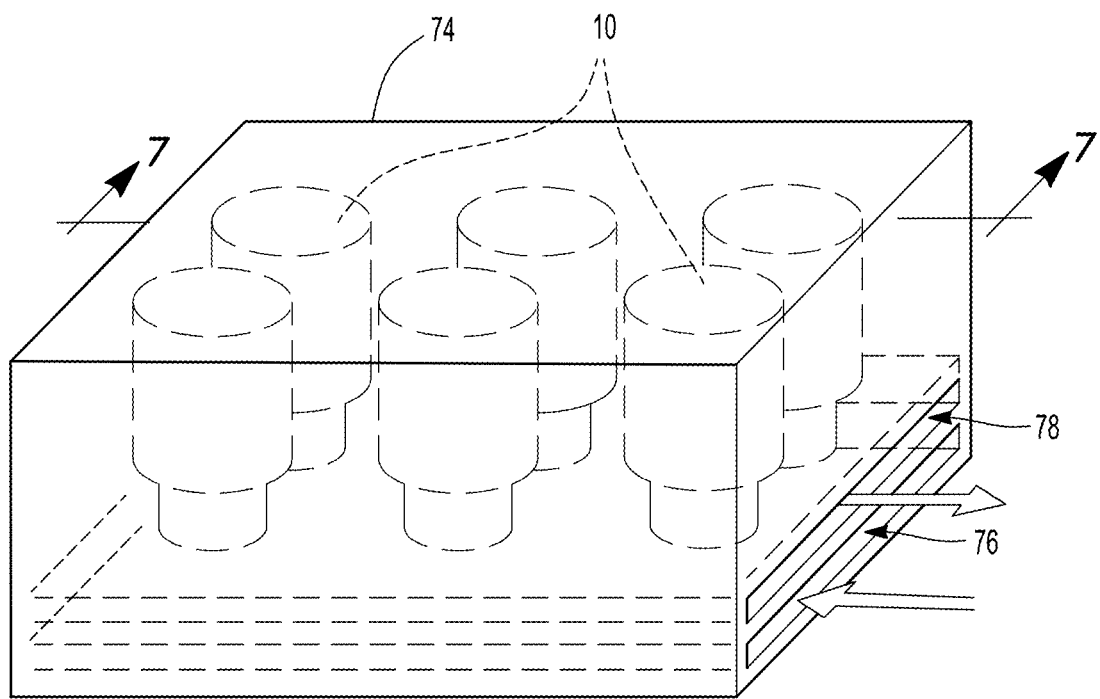
FIG. 6 shows a perspective view of a modular design of a plurality of cooperable thermal oxidizers.
Figure 7:
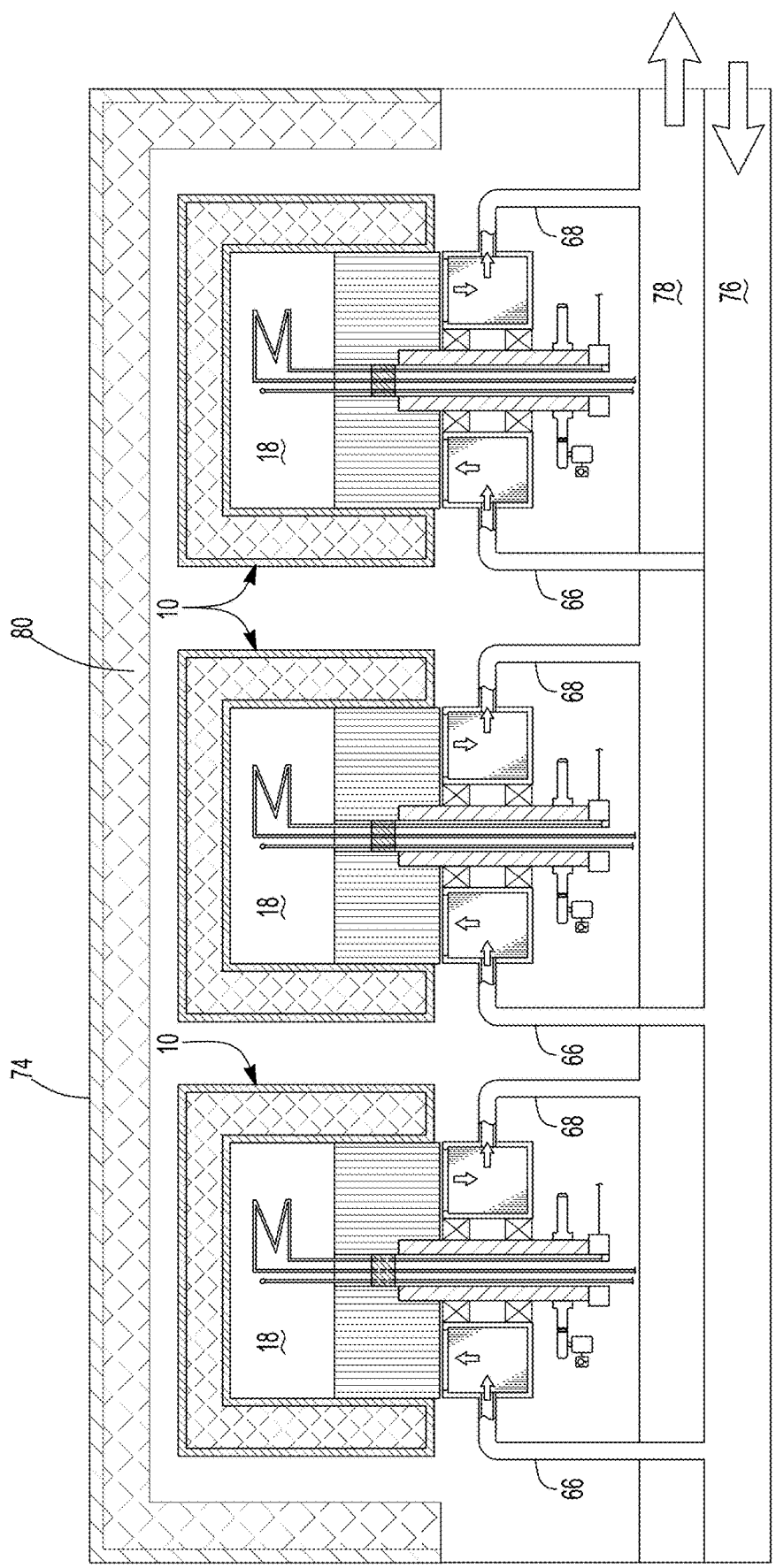
FIG. 7 shows a side cross-sectional view of the modular system of the plurality of cooperable thermal oxidizers through line 7-7 of FIG. 6.

Differing now to FIG. 7, a cross sectional view through line 7-7 of FIG. 6 will now be explained. In this embodiment, the oxidizer 10 are arranged in parallel. Therefore, The inlet conduit 66 of each oxidizer 10 is fluidly connected to the common inlet 76. Likewise, the outlet conduit 68 of each oxidizer 10 is fluidly connected to the common outlet 78. A diameter of each inlet conduit 66 in each outlet conduit 68 may be adjusted too control flow rate of the various gases entering and exiting each oxidizer 10. Alternatively, valves may be implemented to balance flow rate into and out of each oxidizer 10. The housing 74 may also include housing insulation 80 to further reduce loss of heat from the combustion chamber 18 of each oxidizer 10.

It should be understood that while six oxidizers 10 are shown in this embodiment, more or less oxidizers 10 may be included for particular purpose. Further, a facility may add additional oxidizers 10 or modules that include a plurality of oxidizers 10 when VOC output is increased requiring additional abatement. Thus, low cost economical oxidizer 10 of the present invention provides a fully modular solution enabling reduction of greenhouse gases but previously achievable of small facilities.

The invention has been described in an illustrative manner; many modifications and variations of the present invention are possible. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the stated claims following this first disclosed embodiment.

What is claimed is:

1. A regenerative thermal oxidizer assembly, comprising:
a first housing member and a second housing member;
said first housing member defining a regenerative portion and a combustion chamber;
said second housing member defining an inlet chamber and an outlet chamber;
a regenerator is disposed within said regenerative portion of said first housing member and defining an axial opening therethrough;
a thermal element extending into said combustion chamber for providing heat to said combustion chamber thereby initiating combustion inside said combustion chamber; and
a drive motor for rotating said first housing member being relative to said second housing member thereby rotating said regenerator relative to said inlet chamber and said outlet chamber.

2. The assembly set forth in claim 1, further including a tubular member being coaxial with an axial opening and extending to said first housing member through said second housing member.

3. The assembly set forth in claim 2, wherein said tubular member is fixedly connected to said first housing for transferring rotary movement from said drive motor to said first housing.

4. The assembly set forth in claim 2, wherein a conductor transfers electrical energy from a source of electrical energy to said thermal element extending into said combustion chamber thereby transferring combustion heat to said combustion chamber.

5. The assembly set forth in claim 4, wherein said conductor slidably engages a conductive leaf for transferring electrical energy from a source of electrical energy to said thermal element.

6. The assembly set forth in claim 2, wherein a bearing is disposed between said second housing member and said tubular member thereby said first housing member to rotate relative to said second housing member.

7. The assembly set forth in claim 1, wherein said second housing member defines a purge chamber disposed between said inlet chamber and said outlet chamber for providing purge gas to said regenerator.

8. The assembly set forth in claim 1, wherein said second housing member defines a seal compartment including a seal disposed therein for sealing said first housing to said second housing.

9. The assembly set forth in claim 8, wherein said seal comprises a sealing fluid provided to said seal compartment by a source of seal fluid.

10. The assembly set forth in claim 1, wherein said first housing is spaced from said second housing.

11. The assembly set forth in claim 1, wherein said combustion chamber includes a negative pressure being below atmospheric pressure.

12. The assembly set forth in claim 11, wherein said outlet chamber is fluidly connect to one of a pump and a fan for generating negative pressure inside said outlet chamber and said first housing.

13. The assembly set forth in claim 1, further including a temperature sensor disposed within said combustion chamber for determining temperature inside said combustion chamber.

14. The assembly set forth in claim 1, wherein a plurality of assemblies are interconnected though a common inlet.

15. The assembly set forth in claim 14, wherein said plurality of assemblies are disposed within a housing that defines the common inlet.

* * * * *